United States Patent [19]
Baker

[11] 4,337,392
[45] Jun. 29, 1982

[54] POSITION DETECTOR FOR A POWER RODDING APPARATUS

[75] Inventor: Steven W. Baker, Cedar Lake, Ind.

[73] Assignee: Champion Corporation, Hammond, Ind.

[21] Appl. No.: 85,226

[22] Filed: Oct. 15, 1979

[51] Int. Cl.³ .............................................. G06M 3/14
[52] U.S. Cl. ..................... 235/92 DN; 235/92 MP; 235/92 EV; 340/855
[58] Field of Search ....... 235/92 MP, 92 DN, 92 EV, 235/92 DP; 340/860, 854, 855, 539

[56] References Cited

U.S. PATENT DOCUMENTS

| | | | |
|---|---|---|---|
| 2,655,633 | 10/1953 | Minor et al. | 235/92 DN |
| 3,497,958 | 3/1970 | Gollwitzer | 340/680 |
| 3,588,804 | 6/1971 | Fort | 340/18 |
| 3,774,827 | 11/1973 | Graybeal | 226/50 |
| 3,810,090 | 5/1974 | Davis et al. | 340/58 |
| 3,865,305 | 2/1975 | Sampey | 235/92 DN |
| 4,140,970 | 2/1979 | Graziano | 235/92 DN |
| 4,142,152 | 2/1979 | Fincher | 235/92 MP |
| 4,181,959 | 1/1980 | Tateishi | 235/92 DN |

*Primary Examiner*—Joseph M. Thesz
*Attorney, Agent, or Firm*—McDougall, Hersh & Scott

[57] ABSTRACT

A power rodding apparatus is often used in conjunction with laying telephone cable through underground conduits. For such applications the exact location of the end of the rod is important and is determined by a position detecting circuit. The circuit includes a magnetic sensor coupled to a shaft which rotates as a function of the amount of rod which has been extended or retracted from the rodding machine. The sensor also detects the direction of rotation and provides the information to digital logic which encodes the information and transmits it to a remote location. The received information is decoded and utilized to drive a digital display providing instantaneous information regarding the position of the end of the rod. A memory circuit is also provided which stores the total number of operating cycles as a general measure of rod wear.

15 Claims, 11 Drawing Figures

RECEIVER CIRCUIT
FIG.8

MULTIPLIER-DIVIDER CIRCUIT

FIG.11

POSITION DETECTOR FOR A POWER RODDING APPARATUS

BACKGROUND OF THE INVENTION

This invention generally relates to an apparatus of the type often referred to as a power rodder. Such constructions usually include means, such as a cage, for storing an elongated section of flexible rod. The rod is adapted to be engaged by driven rolls associated with the apparatus whereby the rod can be extended outwardly to a remote location and then, upon reversal of the drive rolls, retracted back to the apparatus.

Power rodder constructions are typically used for sewer cleaning operations. In such constructions, means are provided for imparting rotary movement to the rod in addition to the extending and retracting movement referred to. Accordingly, the rod can be rotated for more effective movement through obstructions during extending of the rod. In addition, the rotary action permits the use of cutting blades and other implements which further increases the efficiency of cleaning operations.

Power rodders have also been employed in cable placing operations. The rodders may, for example, be used in conjunction with placing of telephone cable wherein the cable is to be located within an underground conduit. When used in cable placing operations it is desirable to know that exact location of the end of the rod so that obstructions or other problems may be quickly located. Also, the distance between conduit access locations can be accurately measured.

It is accordingly an object of the present invention to provide a position detecting apparatus for use in connection wit a power rodder.

In the usual rodding apparatus it is difficult to determine the location of the rod because of the inaccessibility of its end and the fact that the entire assembly rotates making sensing difficult. Further, extremely severe vibration and environmental conditions are encountered. Accordingly, it is another object of the present invention to provide a position detecting apparatus for a power rodder which is capable of indicating the linear quantity of rod which has been dispensed from a rodding device.

A further object of the invention is to provide a position detecting device utilizing a rotational sensor to detect rod movement and transmitting circuits whereby the position of the rod can be received and displayed at a location remote from the apparatus itself.

Another object of the invention is to provide an apparatus for detecting storing and displaying the total quantity of rods expelled and retracted over a considerable period of time so that the wear rate of the rod can be determined.

Still another object of the invention is to provide an apparatus capable of counting the directional rotations of a drive shaft associated with the rod whereby the direction and quantity of rod moved into or out of the machine can be determined.

Other objects and advantages of the invention will be apparent from the remaining portion of the specification.

PRIOR ART STATEMENT

In accordance with the provisions of 37 CFR§1.97, applicant states that the closest prior art of which he is aware include the following U.S. Pat. Nos. 3,774,827 to Graybeal and 3,588,804 to Fort. Graybeal discloses a power rodder of a type suitable for use with the position detecting apparatus of the present invention. Fort discloses a method for telemetering information from the bottom of a bore hole. The use of a radio link eliminates maintenance and other problems which arise where slip rings are used for direct electrical connections.

DETAILED DESCRIPTION

The present invention is adapted for use in conjunction with an apparatus for extending and retracting lengths of rod, cable or the like. The lengths of rod or cable are moved by tractive forces applied by opposed driven rolls which engage the rod or cable. A storage cage in the form of a reel or the like is utilized for storing the rod when not extended.

Such a device is fully disclosed in issued U.S. Pat. No. 3,774,827 to Graybeal, which patent is hereby incorporated by reference. The specific details of the rodder there disclosed will not be repeated here except to the extent necessary for a complete understanding of the present invention.

In general, the drive rolls for the rodder are divided into first and second sections and separate motors are provided for driving the rolls in each set. The present invention is operatively connected to one of the rolls of the first section and by measuring the rotation of a shaft associated with the roll, the positional information is developed.

Figures 1, 2, 3, 4:
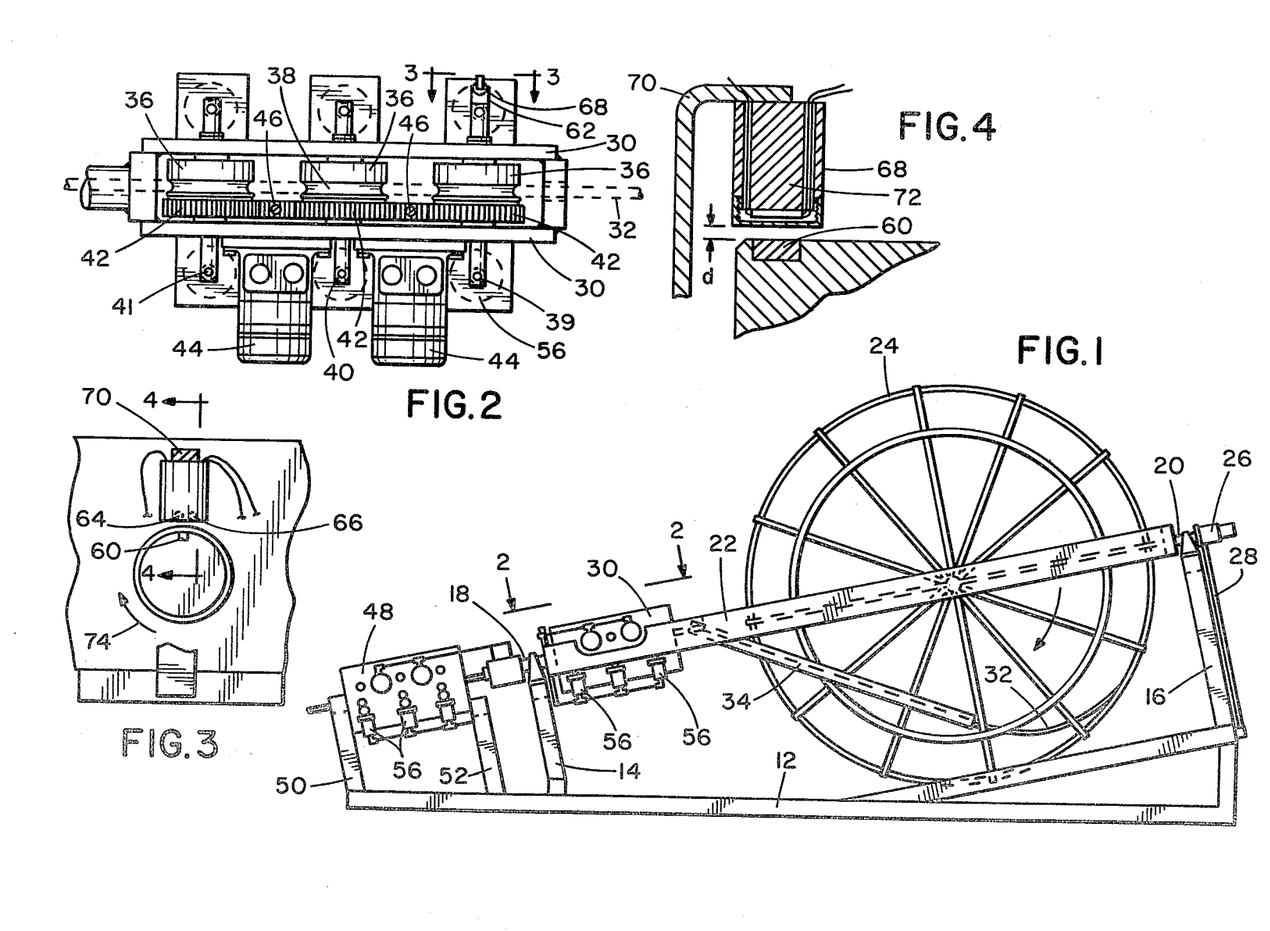
FIG. 1 is a side elevational view of a power rodder construction suitable for use in conjunction with the present invention.
FIG. 2 is an enlarged fragmentary plan view taken along the line 2—2 of FIG. 1 illustrating a drive roll section of the power rodder.
FIG. 3 is an enlarged fragmentary side elevation taken along the lines 3—3 of FIG. 2 illustrating the magnetic pick-up device forming a portion of the present invention.
FIG. 4 is a cross sectional view along the lines 4—4 of FIG. 3 illustrating the construction of the magnetic pick-up.

Referring to FIGS. 1 and 2, a portion of the power rodder disclosed and claimed in U.S. Pat. No. 3,774,827 is illustrated. The rodder includes a horizontal frame 12, serving as a support base for the construction. Vertically extending frame members 14 and 16 include bearing supports 18 and 20 which serve as journals for a generally horizontally extending beam assembly 22.

This assembly defines a central opening for receiving a rod storing cage or reel 24, the reel being journalled for rotation between parallel members of the assembly.

A hydraulic drive motor 26 is mounted at the end of beam 22 for imparting rotary movement to the beam and to the associated reel 24. Hydraulic lines 28 extend to a source of hydraulic fluid (not shown). A first set of drive rolls is mounted between side plates 30 at the forward end of the beam. The drive rolls therein are adapted to engage a rod 32 which is normally stored in the reel 24. This rod extends through guide tube 34 and then outwardly of the apparatus. Operation of the drive rolls imparts rotary movement to the reel 24 about the axis of the reel during which time the rod 32 is either moving into or out of the reel. The motor 26 is adapted to operate independently of or simultaneously with the drive rolls between the side plates 30. Since the side plates 30 and the reel 24 are all mounted on the beam 22, the side plates and reel will rotate with the beam.

The rod drive assembly is illustrated in FIG. 2. This assembly includes opposed rolls with only the upper rolls 36 being illustrated. These rolls include grooves 38 with corresponding aligned grooves being provided in a lower set of rolls. The grooves are dimensioned to receive the rod 32 whereby the rod is engaged by the rolls for achieving movement of the rod.

The rolls 36 are rotatably mounted on shafts 39, 40, 41, which are fixed in the side plates 30. Each of the rolls is associated with a gear 42 which may be formed integrally with the roll body. A pair of motors 44 include drive shafts which extend through one side plate 30 and which carry drive pinions 46. These pinions 46 engage the gears 42 for imparting rotary movement to the rolls 36. The lower rolls are idler rolls including gears corresponding to the gears 42 whereby both upper and lower rolls are driven by the same drive motors.

A second set of drive rolls is mounted between plates 48 at the forward end of the horizontal supporting frame member 12. The side plates are supported on vertically extending members 50 and 52. The side plates 40 are not connected to the beam 22 and, accordingly, this assembly remains stationary relative to its supporting frame members. The second drive rolls are driven by hydraulic motors. A swivel coupling 54 provides hydraulic fluid to the motors for that purpose.

Both drive roll assemblies are provided with hydraulic cylinders 56 having pistons connected to the lower rolls of the roller pairs. During operation of the rodder, hydraulic fluid is provided to the cylinders 56. This causes the pistons which are connected to the roll shafts 39, 40 and 41 to apply pressure to the rod located between the roll pairs. The greater the hydraulic pressure applied by the cylinders the greater the tractive forces applied to the rod. For additional details concerning the mechanical construction and operation of the rodder illustrated in FIGS. 1 and 2, reference is made to the aforementioned U.S. Pat. No. 3,774,827.

Referring to FIGS. 2, 3 and 4, the magnetic sensor according to the invention is illustrated in conjunction with the opposed drive rolls located between plates 30. Shaft 39 associated with roller 36 has provided at one end thereof a rotational sensing unit. The unit includes a small permanent magnet 60 mounted on the periphery of a wheel 62 attached to the end of shaft 39. A pair of magnetically operated reed switches 64 and 66 are provided in an enclosure 68 positioned above the wheel 62 on a mounting bracket 70. The switch housing 68 is provided with an O-ring seal to maintain it water tight and the reed switches are encapsulated in a silicon material 72. The switches are positioned above the wheel 62 by a distance d which is preferably on the order of 0.25 inches.

As will be apparent during operation of the rodder, the motors 44 through pinion 46 drive the rolls 36 extending or retracting the rod 32. In so doing, the shaft 39, among others, will rotate causing the magnet attached to the end thereof to operate the reed switches 64 and 66 as it passes over each one. The sequence in which the switches are actuated provides an indication of the direction of rotation of the shaft and hence whether the rod 32 is being extended or retracted. This information is utilized by the electrical circuits of the invention to determine the change in position of the end of the rod 32.

To illustrate this direction discrimination, if it is assumed, for example, that the shaft is rotating in the direction indicated by arrow 74 in FIG. 3, the reed switch 64 will close before switch 66. If the rotation of the shaft is reversed switch 66 will close before switch 64.

System Block Diagram

Figure 5:
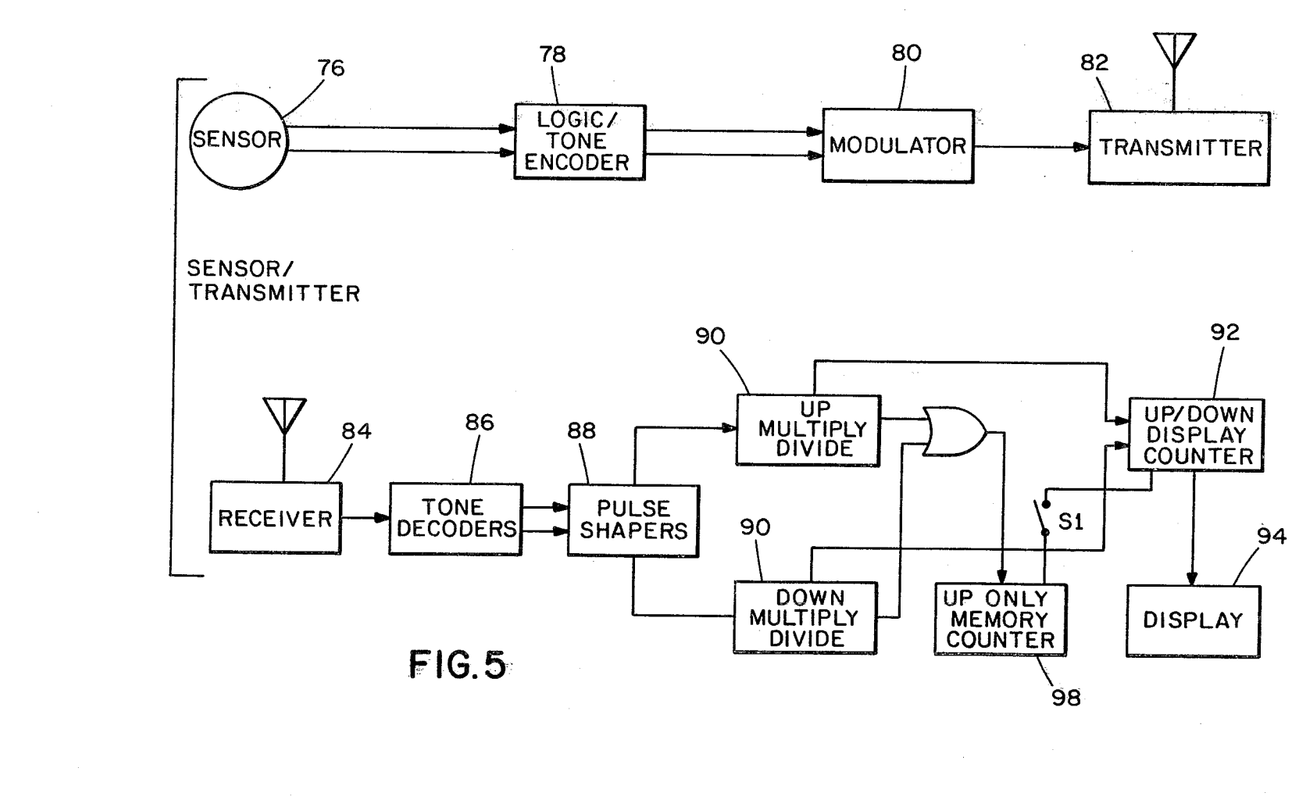
FIG. 5 is a block diagram of the position detecting circuit according to the present invention.

Referring now to FIG. 5, a block diagram of the electric circuit according to the invention is illustrated. The sensor briefly described in connection with FIGS. 2, 3 and 4 is represented at 76. The outputs from the reed switches 64 and 66 are provided to block 78 which determines the direction of rotation of the shaft 39 and generates a tone representative of the direction of rotation. Block 80 indicates that the tone is then used to audio modulate a carrier frequency and transmitted via transmitter 82 to a remote receiver 84.

The receiver, upon detecting the broadcast signal, demodulates and provides it to tone decoders 86. The information is pulse shaped at 88 and applied to multiplier-divider circuits 90 for appropriate scaling to feet or meters. For example, on the machine disclosed in U.S. Pat. No. 3,774,827 it has been determined that for each rotation of the shaft 39 approximately 7.65 inches of rod is extended or retracted. The multiplier-divider circuits permit the necessary scaling to reflect such empirically determined relationships.

From the scaling circuits 90 the data is provided to up/down display counters 92 for driving a display 94 which represents the lineal quantity of rod which has been extended from the rodder unit and thereby yields the location of the end of the rod. The output from the scaling units 90 is also applied to an accumulator memory 98 which, upon demand, will display the total quantity of rod extended and retracted over an extended time period.

Rotation Logic

Figure 6:
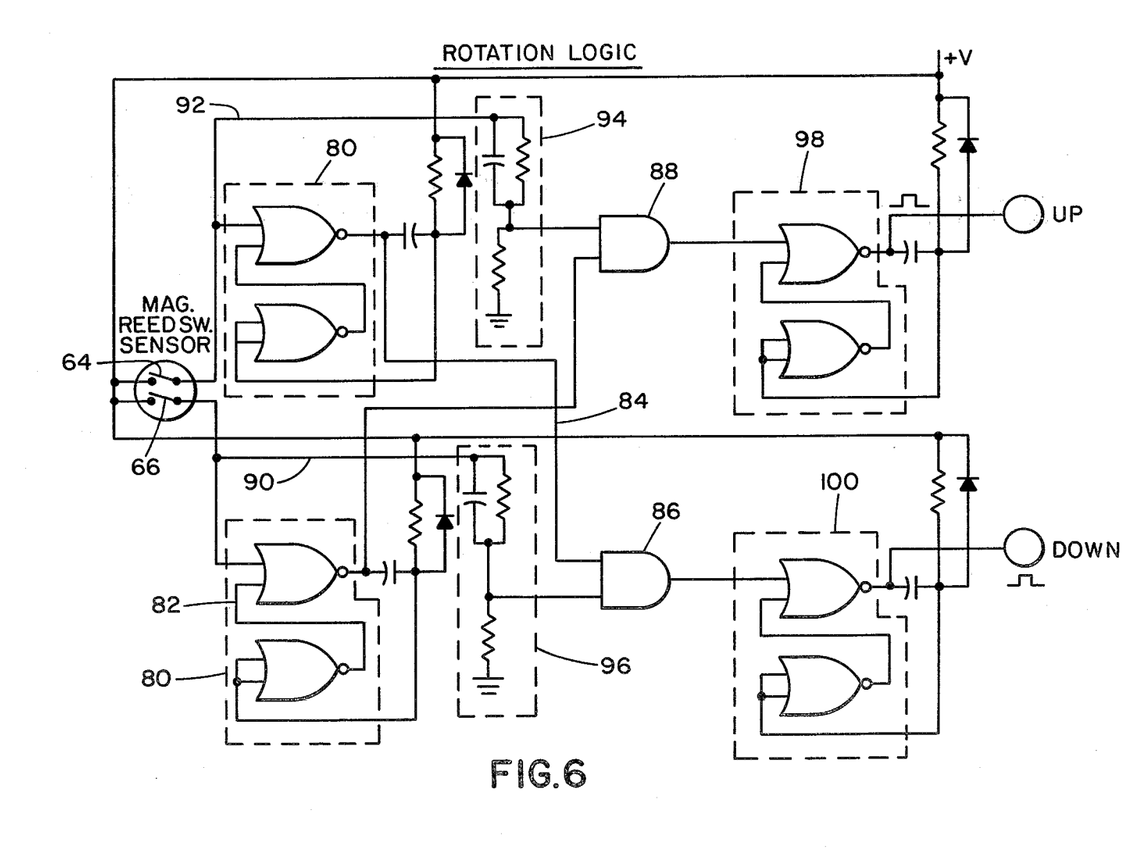
FIG. 6 is a schematic diagram of the rotation logic for the sensor.

Referring to FIG. 6, the rotation logic forming a portion of block 78 is illustrated. The reed switches 64 and 66 are illustrated in circuit with logic gates suitable for determining which switch is first closed. Switch 64 is connected as an input to a retriggerable monostable multivibrator 80 formed by the cross-connection of two NOR gates in the indicated manner. Switch 66 is similarly connected to a multivibrator 82. The output of multivibrator 80 is connected via line 84 as one input to AND gate 86. Similarly, the output of multivibrator 82 is connected as one input to AND gate 88. The other inputs to gates 86 and 88 are provided from the magnetic reed switches on lines 90 and 92, respectively, via debounce networks 94 and 96.

The outputs from the AND gates are provided to an additional pair of monostable multivibrators 98 and 100. The output from the monostables are square wave pulses which are fed to the tone generator of FIG. 7. The output from monostable 98 is designated the "up" pulse while the output from monostable 100 is designated the "down" pulse. The up pulse denotes movement of the cable in a first direction as, for example, extension of the cable from the cage, therefore requiring an ascending count while a down pulse represents return movement of a cable requiring a descending count. The circuit of FIG. 6, therefore, determines which of switches 64 and 66 is first to close for each revolution of shaft 39. This is accomplished in the following manner.

When one of the switches 64 and 66 closes its triggers the corresponding multivibrator 80 or 82. This locks out the other switch by disabling the AND gate through which the signal for the other switch passes. The first switch to close passes through the debounce circuit, its own AND gate which remains enabled and triggers the corresponding monostable multivibrators 98 and 100. Assuming switch 64 closes before switch 66, monostable 80 will be triggered. This disables switch 66 by disabling AND gate 86. Switch 66 remains disabled as long as switch 64 is closed because of the retriggerable feature of the monostables. Switch 66 will be enabled again after a time determined by the values of the RC networks formed by capacitor C1 and R1. The value of these components is chosen to give the magnet time to clear the reed switches before the logic circuitry resets itself. The diodes D1 provide a low impedance discharge path for capacitor C1 resulting in a fast reset time.

The closure of switch 64 also produces a pulse via the debounce circuitry 94 and gate 88 for triggering the monostable 98 resulting in the production of an up pulse. Rotation of the shaft 39 in the opposite direction would result in precisely the same operation except that a down pulse would be produced when switch 66 closes before switch 64. Preferably, the circuitry of FIG. 6 is formed from CMOS integrated circuits and are continuously powered by a small battery.

Tone Generator, Modulator and Transmitter

Figure 7:
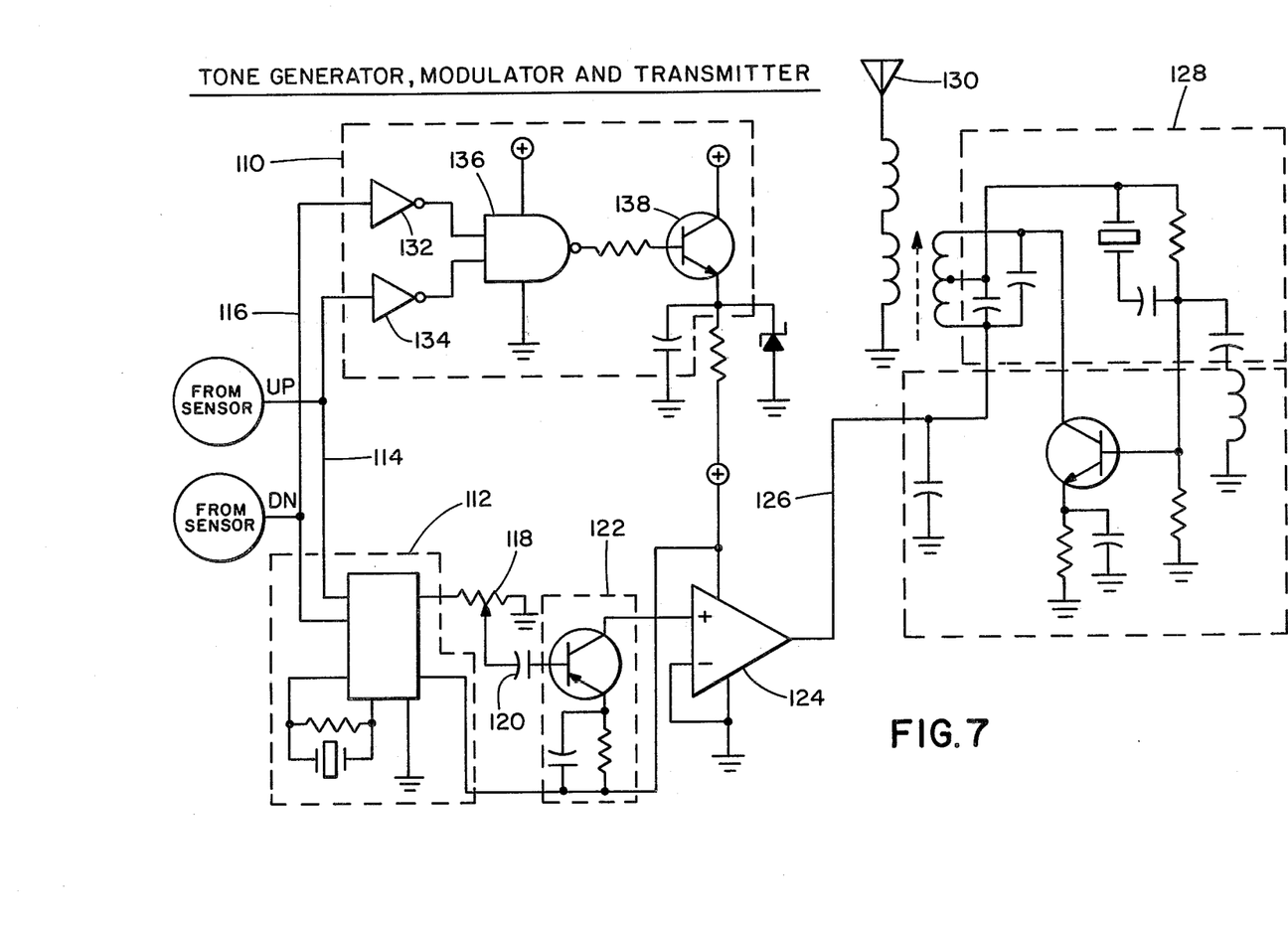
FIG. 7 is a schematic diagram of the tone generator, modulator and transmitter circuits according to the invention.

Referring to FIG. 7, the tone generator, modulator and transmitter circuit is illustrated. This circuit requires a considerable amount of power as compared to the rotation logic. Accordingly, it is necessary, in order to conserve battery life, that the unit operate only when a pulse is detected. Accordingly, a power switching circuit 110 is provided for providing power to the tone generator 112, the modulator and transmitter sections only when pulses are received from the rotation logic.

The tone generator consists of a commercially available integrated circuit designated MK-5087 available, for example, from Mostek. This circuit can be programmed to produce one or more of eight standard tone frequencies utilized for digital communication purposes. For example, the up pulse may be applied to the tone generator via line 114 and result in the tone generator producing a 1.63 KHz tone while a down pulse on line 116 may cause the tone generator to produce a 1.21 KHz tone. The output from the tone generator is provided through potentiometer 118 and capacitor 120 to a preamplifier stage 122. In turn, the preamplifier drives a power amplifier 124, the output of which is utilized to modulate the transmitter carrier via line 126. The output from the power amplifier 124 is applied to a crystal control oscillator stage 128 preferably operating at either 50 MHz or 300 MHz although other frequencies may be utilized. In a manner well known by those skilled in the art, the audio modulated carrier is then broadcast via antenna 130.

As previously indicated, the tone generator, amplifier and transmitter are powered only during receipt of pulses from the rotation logic by virtue of the switching section 110. Section 110 receives inputs from lines 114 and 116 through inverters 132 and 134, the outputs of which are applied to NAND gate 136. When no pulse is present the output of the NAND gate is low maintaining a transistor 138 in a nonconducting condition removing power from the tone generator, amplifier and transmitter. Whenever a pulse is received on either of lines 114 or 116 the output of the NAND gate changes switching on the transistor 138 powering the aforementioned circuits.

The circuit of FIG. 7 represents an important aspect of the present invention. As indicated in the background portion of this specification, rodding machines of the type for which the present invention is intended operate in extremely noisy electrical environments and because of the nature of the machinery it is not practical to provide a direct electrical connection between the reed switches 64 and 66 and digital displays and associated logic described in connection with FIGS. 10 and 11. This can be readily appreciated with reference to FIG. 1 by noting that the shaft 39 to which the switches are attached is secured to the beam 22 which is rotating on an axis perpendicular to the axis of shaft 39. Because the circuitry of FIGS. 6 and 7 can be conveniently provided in a small sealed package, it can be mounted for rotation with the sensors and transmits the necessary information to a desired remote location where the information can be processed and displayed.

Receiver Circuit

Figure 8:
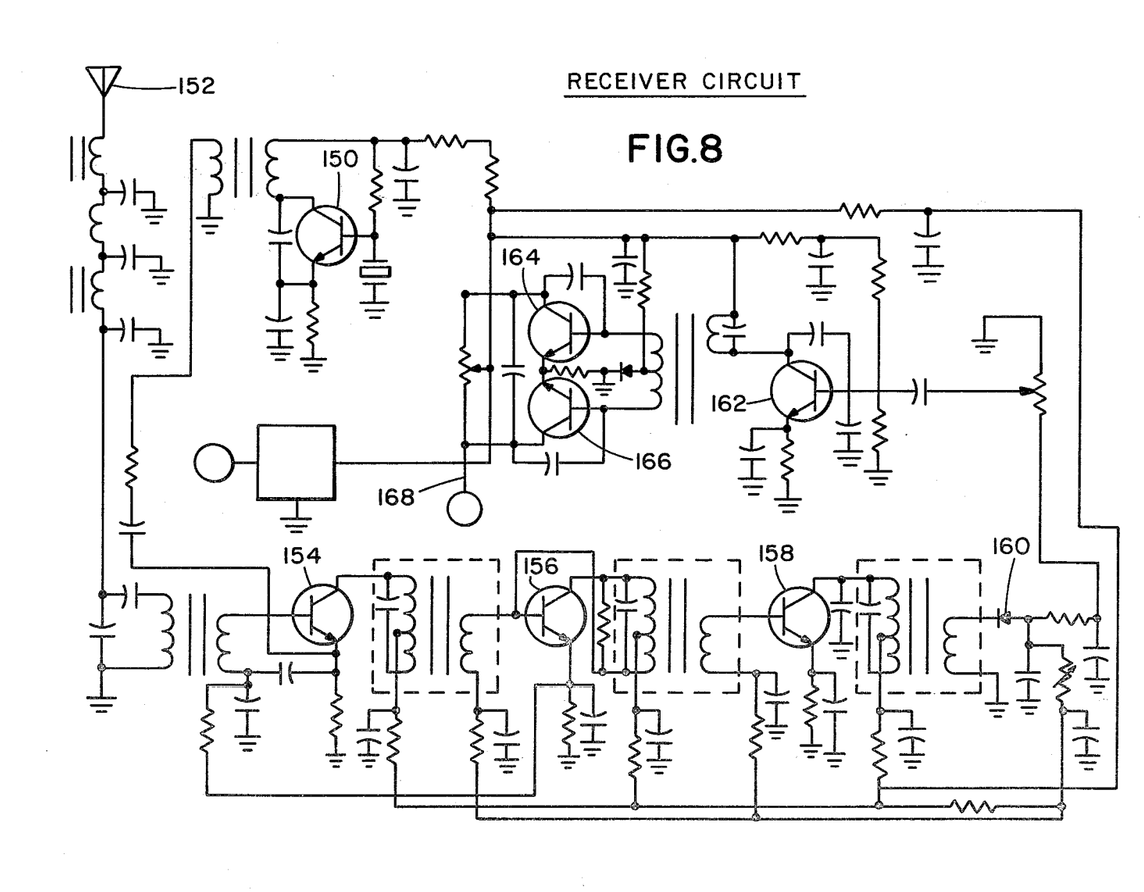
FIG. 8 is a schematic diagram of a standard superheterodyne receiver circuit suitable for use in the present invention.

Referring to FIG. 8, there is disclosed a receiver circuit suitable for use with the present invention. A detailed description of this circuit is believed unnecessary in view of the fact that it is an adaptation of a standard superheterodyne circuit used in commercial AM receivers. Briefly, the operation of the receiver circuit is as follows. A crystal controlled local oscillator 150 produces a frequency 455 KHz lower than the transmitter frequency allowing the receiver to lock onto the transmitter channel. The RF current is mixed or beat against the incoming signal from antenna 152 by transistor 154. This results in the standard 455 KHz IF signal when a tone is being received. IF amplifiers 156 and 158 are selectively tuned to amplify the desired IF signal. Thus, when a tone is transmitted it is fed through the IF stages and detected by diode 160. The signal is then fed to the preamplifier 162 and push-pull output transistors 164 and 166. The output from the push-pull amplifiers is provided on line 168 and will be one of the two tones transmitted by the circuit of FIG. 7. The output on line 168 is applied to the tone decoder circuit of FIG. 9 to identify which tone has been received.

Tone Decoder

Figure 9:
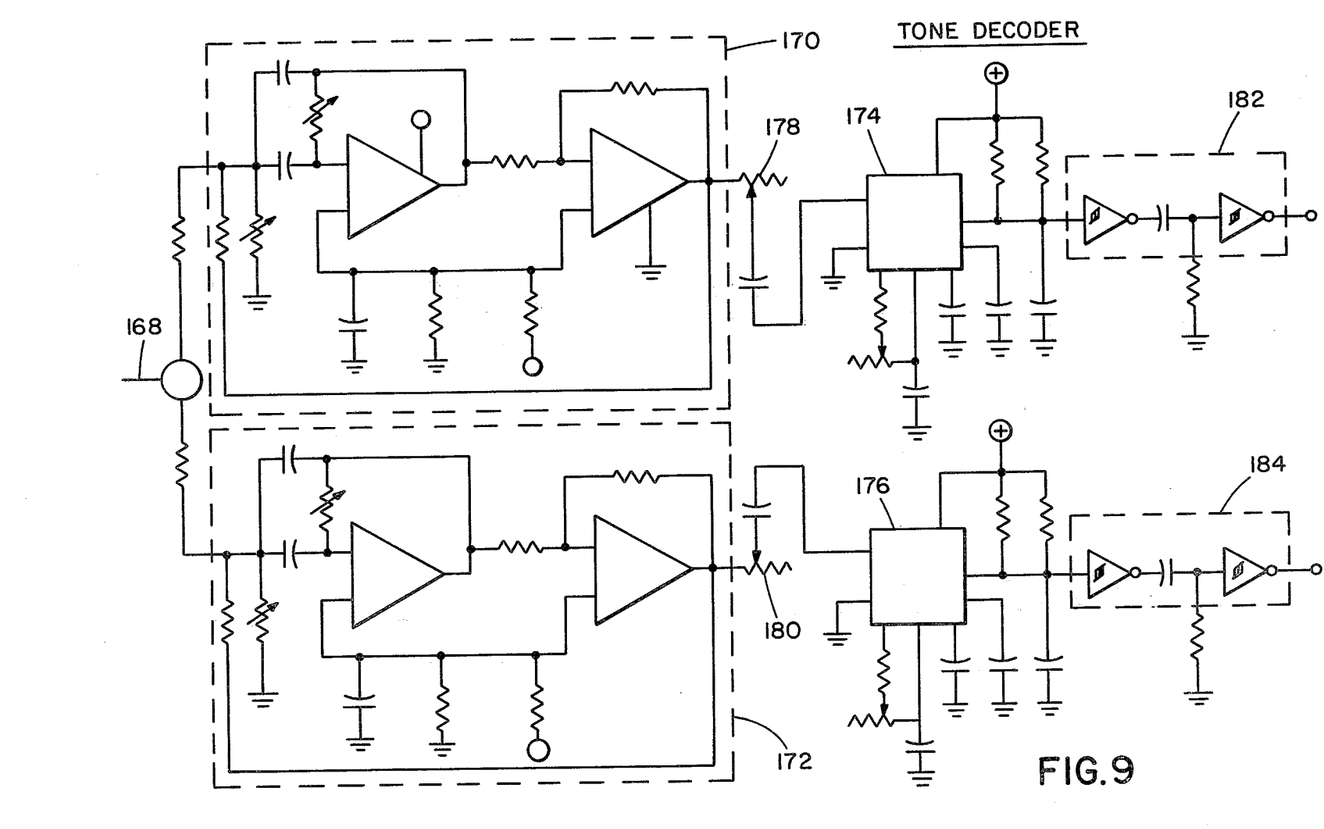
FIG. 9 is a schematic diagram of a tone decoder according to a preferred embodiment of the invention.

Referring to FIG. 9, the tone decoder circuit is illustrated. The tone decoder consists of two active filter circuits 170 and 172, the outputs of which are applied to commercially available tone decoders type 567 manufactured, for example, by Signetics Corp. The tone decoders 174 and 176 produce outputs which are filtered and ultimately provided to one of two multiplier-divider circuits of the type illustrated in FIG. 10.

The active band pass filters 170 and 172 are tuned to the two tone frequencies selected which represent the high and low tones. The filters are needed to attenuate all frequencies outside the pass bands centered on the selected frequencies. In the case of the example utilized in connection with FIG. 7, the frequencies are 1.21 KHz and 1.63 KHz. The filters eliminate noise and harmonics of the tone frequencies which might result in erroneous readings. The outputs from the filters 170 and 172 are fed via attenuating potentiometers 178 and 180 to the tone decoders 174 and 176, respectively. The output of the decoders is noisy and, accordingly, is filtered and debounced. This is accomplished by the Schmitt trigger inverters 182 and 184. The output from the Schmitt trigger 182 is provided to a multiplier-divider circuit for up counts while the output from Schmitt trigger 184 is provided to a multiplier-divider circuit for down counts.

Multiplier-Divider Circuits

Figure 10:
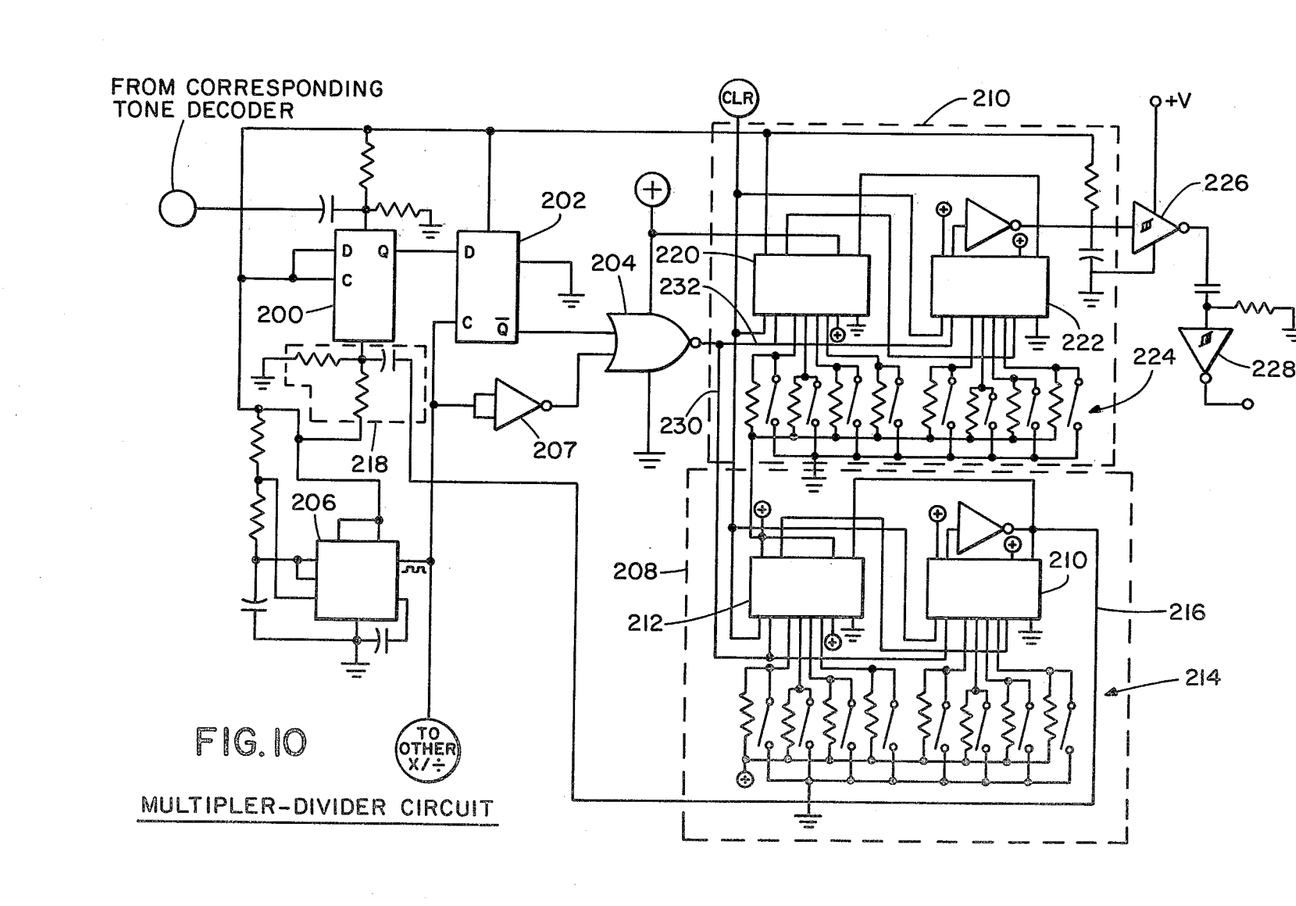
FIG. 10 is a schematic diagram of a multiplierdivider circuit for use in the present invention.

FIG. 10 illustrates the multiplier-divider circuit for use with the present invention. As previously indicated, two such circuits are required, one for the up count and one for the down count. The purpose of the circuit of FIG. 10 is to scale the received pulses to correspond to the empirically determined linear value which the pulses represent. With respect to the example given in connection with FIG. 7, it will be recalled that one pulse equals 7.65 inches of rod being extended or retracted from the rodder apparatus. The multiplier-divider circuits provide conversion from pulse counting to measurement in feet or meters. Thus, for example, if each rotational pulse received is multiplied by 25 and subsequently divided by 39, a conversion of pulses to feet is accomplished with 0.5% accuracy. Similarly, if an input pulse is multiplied by 5 and divided by 6 a conversion to meters results with approximately the same accuracy.

The circuit of FIG. 10 is easily programmed to perform the requisite multiplication and division operations of the incoming pulses. It is capable of multiplication and division of any number between 1 and 255. An incoming pulse from the tone decoder circuit is applied to the set input of an RS type flipflop 200, the output of which is provided to the D input of a latch 202. The $\bar{Q}$ output of latch 202 is provided as one input to NOR gate 204, the other input being a series of clock pulses from a type 555 clock circuit 206 inverted by gate 207. The clock pulses are also applied to the clock input of the latch 202 for a purpose to be described.

The output of the NOR gate 204 is applied as a clock input to the multiplier section 208 via line 230 and simultaneously to the divider section 210 via line 232. The multiplier and divider sections are each formed by a pair of 74C161 binary counters. In the case of the multiplier, counters 210 and 212 have their preset inputs connected to a switching network 214 by which a suitable multiplier is selected. The output from the multiplier 208 is provided on line 216 which, after pulse shaping by RC network 218, is applied to the clear or reset input of flipflop 200.

The divider 210 is formed from binary counters 220 and 222 and is similarly connected to a switching network 224 whereby the divisor can be selected.

With respect to both the multiplier and divider, it will be recognized by those skilled in the art that the switching networks 214 and 224 are connected to the preset inputs of the counters. The selected number (255 minus number needed for divisor or multiplicand) is determined by applying either a positive voltage or ground to each input representing a binary one or a zero, respectively. The output from the divider is shaped by Schmitt trigger inverters 226 and 228 and supplied to the display and logic circuit of FIG. 11.

Operation of the multiplier-divider is as follows. It will be assumed that the circuit has been programmed to multiply by 25 while the divider has been programmed to divide by 39. An incoming pulse from the tone decoder circuit sets flipflop 200, in turn latching flipflop 202 to permit clock pulses from the clock generator 206 to pass gate 204 and be applied to the multiplier via line 230 and the divider via line 232. Since the tone pulse is to be multiplied by 25, that many clock pulses are counted by the counter circuits 210 and 212 before an output is produced on line 216 thereby resetting the flipflop 200. Thus, for every tone pulse from the tone decoder circuit, 25 clock pulses are gated into the multiplier section before the flipflop 200 is reset.

Simultaneously, the divider circuit is receiving and counting the same clock pulses. It has been set to divide by 39 and produces an output only when the total is reached. Thus, for every 39 clock pulses counted, one output pulse is produced and sent to the display and logic circuit of FIG. 11. As will be perceived, for a single input pulse the divider will not produce any output pulse since it will not reach 39 before the multiplier shuts off the clock pulses. The count of 25, however, is retained in the divider and when the next pulse is received from the tone decoder, counting will begin from that value and an output is produced when 39 is reached. At that point the divider is reset to zero and continues counting. In this manner scaling of the input pulses from the tone decoder is effected so that each pulse is multiplied by 25 and divided by 39. As indicated, other scaling factors can be utilized merely by changing the programming inputs at networks 214 and 224.

Display and Counter Circuit

Figure 11:
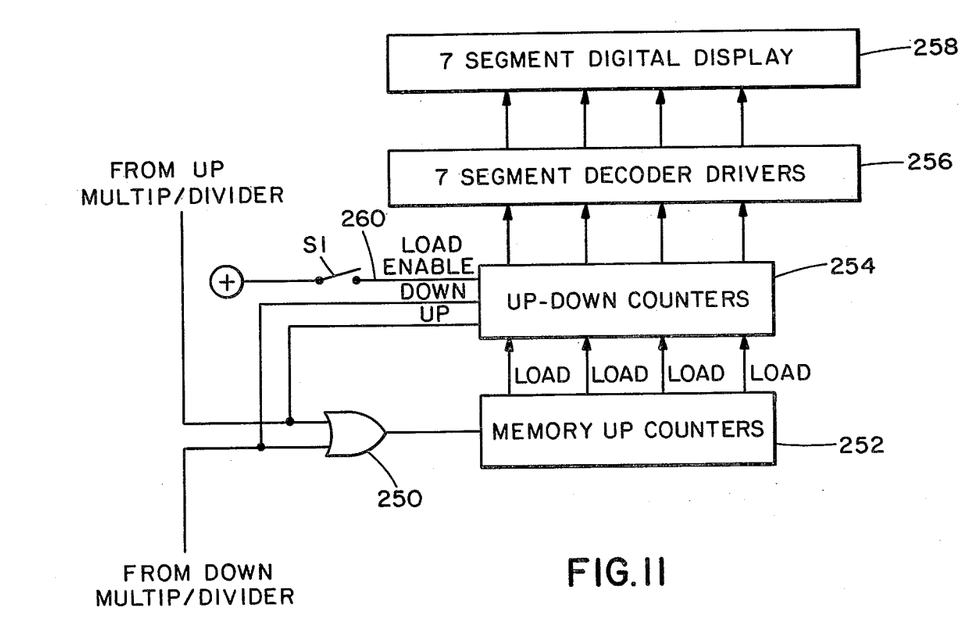
FIG. 11 is a block diagram of the display and counter circuit according to the invention.

FIG. 11 illustrates a display and counter circuit suitable for use with the present invention. The output pulses from the divider circuits of FIG. 10 are fed to the circuit of FIG. 11 and applied as inputs to an OR gate 250, the output of which is applied as an input to a plurality of up counters 252. The inputs from the multiplier-divider circuits are also applied directly, or through buffers, to a plurality of up/down counters 254 which are connected to seven segment decoder-dividers 256. The decoder-drivers operate the usual seven segment digital display 258 in a manner well known by those skilled in the art. The up counters may be of a commercially available type as, for example, 4518s manufactured by National Semiconductor or RCA, while the up/down counters may be 74C192s manufactured, for example, by Texas Instruments.

The up counters 252 are connected to the up/down counters 254 so that the contents of the up counters can be loaded on command into the up/down counters for subsequent display. Control of this loading operation is by a load enable line 260 which is switch actuated from the front panel of the display. When the switch S1 for the load enable line 260 is operated, the contents of the up counters 252 are loaded into the up/down counters 254 to permit display of the cumulative total length of rod which has been extended and retracted. So that this information is not lost, the counters 252 are connected directly to the battery so that they are powered even when the equipment is not in use. Because they are CMOS type circuits the current drain is extremely low.

When the load enable line 260 is not actuated, the up/down counters are responsive to the pulse information from the multiplier-divider circuits. They count and cause to be displayed the appropriate values indicating the location of the end of the rod. If the rod is being extended a sequence of up pulses will be received, which having been scaled by the multiplier circuit, can be read directly in feet or meters. When the rod is retracted the down multiplier-divider will cause the counters 254 to count down, reducing the value displayed.

As indicated in the background portion of the specification, it is desired to monitor the location of the end of the rod and this is accomplished by the data fed into the up/down counters 254 during normal operation. Occasionally, on a daily, weekly or monthly basis it is desirable to determine the total lineal travel of the rod and this is accomplished by actuating switch S1 to load the contents of the up counters 252 into counters 254 for subsequent display. As is apparent from FIG. 11, the up counters 252 count both the up and down counts from the multiplier-divider by virtue of the OR gate 250. The contents of the up counters, therefore, are a direct measure of total lineal travel.

While I have shown and described embodiments of this invention in some detail, it will be understood that this description and illustrations are offered merely by way of example, and that the invention is to be limited in scope only by the appended claims.

I claim:

1. A circuit for detecting the amount of rod which has been extended into a conduit from a storage reel of a rodding device comprising:
   (a) means for detecting the amount and direction of movement of said rod and producing pulse signals representative of said movement,
   (b) means for encoding said pulse signals and transmitting them via radio frequency transmission to a remote location,
   (c) means for receiving said radio frequency transmission and decoding it to recover said pulse signal information at said remote location,
   (d) pulse counting means,
   (e) display means for displaying the contents of said pulse counting means,
   (f) scaling means receiving the decoded pulse signals and producing said scaled pulse signals to said pulse counting means which correspond to lineal measurement units whereby the displayed contents of said pulse counting means is a direct and instantaneous measure of the length of said rod extended from said reel.

2. The circuit according to claim 1 further including accumulator means connected to an input of said pulse counting means, said accumulator means also receiving the scaled pulse signals from said scaling means, means for loading the contents of said accumulator means into said pulse counting means whereby the accumulated total of rod extension and retraction may be displayed.

3. The circuit according to claim 2 wherein said accumulator is an up only counting means which accumulates the scaled pulse signals.

4. The circuit according to claim 1 wherein said detecting means includes:
   (a) sensor means operatively positioned on said rodding device for detecting movement of said rod including the direction of said movement,
   (b) logic means operatively connected to said sensor means and producing first pulse signals representative of rod extension and second pulse signals representative of rod retraction.

5. The circuit according to claim 4 wherein said sensor means includes:
   (a) magnetic means secured to a drive shaft of said rodding device for rotation therewith,
   (b) a pair of magnetically operated switches mounted to said rodding device in operative relation to said magnetic means,
   whereby rotation of said shaft causes said magnetic means to activate said switches, the order of actuation determining the direction of rod movement.

6. The circuit according to claim 4 wherein said encoding and transmitting means includes:
   (a) means for generating distinctive modulating signals each representative of one of said first and second pulse signals,
   (b) a transmitting circuit for transmitting a carrier frequency modulated by said modulating signals.

7. The circuit according to claim 6 wherein said encoding and transmitting means is battery powered and includes switch means for energizing the encoding and transmission means only when said pulse signals are received from said logic means thereby to conserve power.

8. The circuit according to claim 6 wherein said receiving and decoding means includes:
   (a) means for demodulating the modulated carrier frequency to recover said modulating signals,
   (b) means for decoding said modulating signals to recover said first and second pulse signals, said decoding means supplying said first and second pulse signals to said scaling means.

9. The circuit according to claim 8 further including band pass filters receiving the modulating signals, each filter passing substantially only one of said modulating signals to said decoding means thereby to reduce the effect of noise and harmonics on the decoding means.

10. The circuit according to claim 4 wherein said scaling means includes multiplier-divider circuits for separately scaling the decoded first and second pulse signals, each of said multiplier-divider circuits having selectable multipliers and divisors to effect conversion of the pulse signals into signals representative of a lineal measurement unit.

11. The circuit according to claim 10 wherein said pulse counting means are up-down counters which count up for pulses from the multiplier-divider circuit for the decoded first pulse signals and down for the pulses from the decoded second pulse signal multiplier-divider.

12. The circuit according to claim 1 wherein said pulse counting means are up-down counters which count up for extension of said rod and down for retraction of said rod.

13. The circuit according to claim 1 wherein said display means includes a seven segment digital display and means for driving said display from said pulse counting means.

14. The circuit according to claim 1 wherein said scaling means include circuits for multiplying and dividing the decoded pulse signals by selectable multipliers and divisors to effect conversion of the pulse signals into signals representative of a lineal measurement unit.

15. A circuit for detecting the amount of rod which has been extended from a storage reel of a rodding device comprising:
   (a) means for detecting the amount and direction of movement of said rod and producing pulse signals representative of said movement,
   (b) means for encoding and transmitting said pulse signals to a remote location including means for generating distinctive modulating signals representative of said pulse signals and a transmitting circuit for transmitting a carrier frequency modulated by said modulating signals,
   (c) means for receiving and decoding said pulse signals at said remote location,
   (d) pulse counting means,
   (e) display means for displaying the contents of said pulse counting means,
   (f) scaling means receiving the decoded pulse signals and producing scaled pulse signals to said pulse counting means which correspond to lineal measurement units whereby the displayed contents of said pulse counting means is a direct and instantaneous measure of the length of said rod extended from said reel.

* * * * *